United States Patent [19]
Duckett

[11] 4,055,318
[45] Oct. 25, 1977

[54] CONSTRUCTION ELEMENT

[75] Inventor: Herbert John Duckett, New Plymouth, New Zealand

[73] Assignee: Tasman Joinery Company Limited, New Plymouth, New Zealand

[21] Appl. No.: 726,008

[22] Filed: Sept. 23, 1976

[30] Foreign Application Priority Data
Oct. 24, 1975  New Zealand ............... 179053

[51] Int. Cl.² ............................................. A47G 29/02
[52] U.S. Cl. ...................................... 248/243; 403/171;
403/231; 52/283; 52/738
[58] Field of Search ............... 52/263, 281, 283, 733, 52/737, 738; 114/90, 112, 102; 312/263; 248/188, 188.1, 243; 403/231, 263, 171, 176

[56] References Cited
U.S. PATENT DOCUMENTS

| 345,944 | 7/1886 | Anderfuren | 312/263 |
|---|---|---|---|
| 2,788,096 | 4/1957 | Franks | 403/176 |
| 2,809,404 | 10/1957 | Hinds | 52/282 |
| 3,242,627 | 3/1966 | Fountain | 52/281 |
| 3,749,343 | 7/1973 | Marschak | 248/188 |
| 3,886,699 | 6/1975 | Bergmann, Jr. | 52/281 |

FOREIGN PATENT DOCUMENTS

| 940,798 | 12/1948 | France | 248/188 |
|---|---|---|---|
| 1,966,042 | 5/1971 | Germany | 52/595 |
| 2,252,377 | 5/1974 | Germany | 248/188 |

Primary Examiner—Price C. Faw, Jr.
Assistant Examiner—Henry Raduazo

[57] ABSTRACT

A construction element which consists of a length of tube, rod or other rolled or extruded section which has two seatings on its periphery. The seatings are each adapted to hold at a predetermined angle to one another and a predetermined angle to the continuous length of the ends of two strips and to also hold between the strips a screwably connected wedge. The two strips are thereby firmly held into the seatings.

8 Claims, 6 Drawing Figures

U.S. Patent
Oct 25, 1977
4,055,318
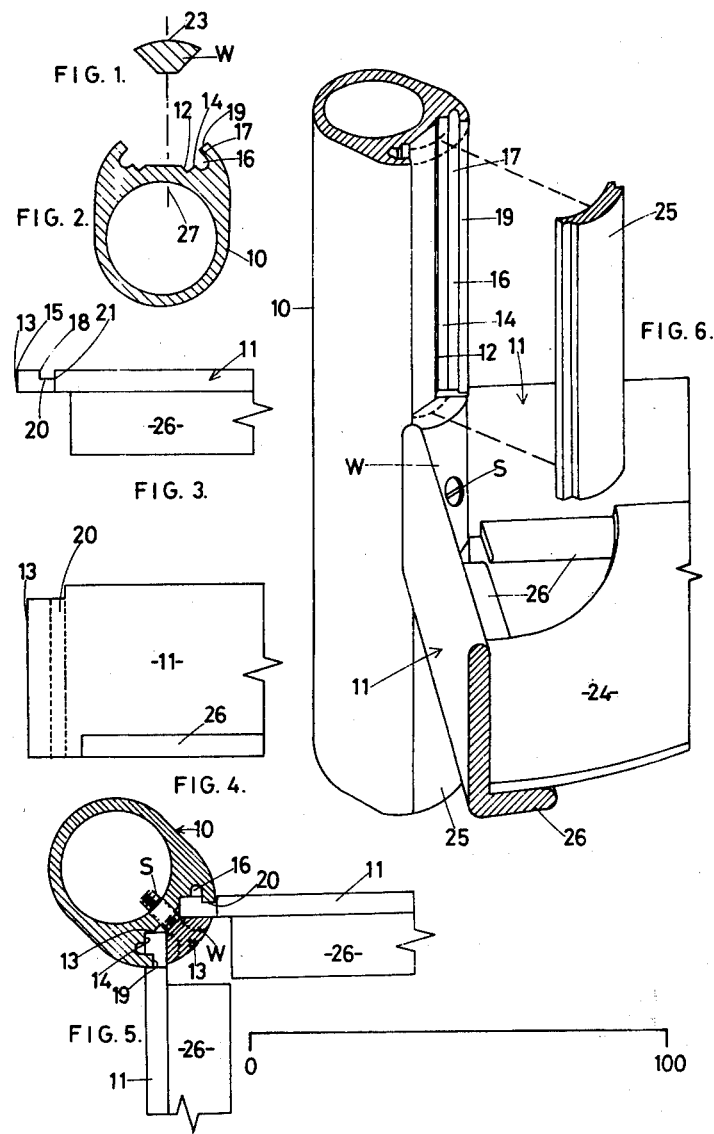

CONSTRUCTION ELEMENT

BACKGROUND OF THE INVENTION

This invention relates to a construction element. Furniture, taken for present purposes to include office and kitchen furniture, is very commonly built up from members which are either substantially or approximately vertical and horizontal. Joining the various members involves joints approximately at right-angles and in traditional wooden furniture, many well known right-angled joints have been developed. When some of these joints are well made the members are joined rigidly together. Other joints have been devised when the members were metal or plastic and these can be welded, soldered or cemented, to form rigid joints. Such joints however are rather expensive to make and when made cannot be taken apart for reassembly in a different configuration. Numbers of "knock-down" joints are known, some of which are very quick and easy to assemble, but make joints which are far from rigid.

It is an object of the present invention to provide a construction element which lends itself to forming a rigid but demountable joint.

SUMMARY OF THE INVENTION

Accordingly, the invention may broadly be said to consist of a construction element comprising a continuous length of tube, rod or other extruded or rolled section, having on its periphery two seatings adapted to hold at a predetermined angle to each other and a second predetermined angle to the line of the continuous length the ends of two strips and to hold between the two strips a screwably connected wedge, whereby the two strips are firmly held into the seatings.

This invention may also broadly be said to consist in the parts, elements and features referred to or indicated in the present specification, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

FIG. 1 is a cross-section of a wedge,

FIG. 2 is a cross-section of an extrusion, one form of the construction element of the present invention, FIG. 3 is an angle adapted to be held on a seating of FIG. 2 viewed from the same point of view as FIG. 2, FIG. 4 is the same angle in front elevation, FIG. 5 is a cross-section of a joint using the parts of FIGS. 1 to 4, and FIG. 6 is an isometric view showing a corner of, for example, a trolley, showing in particular a cover bead.

DETAILED DESCRIPTION OF CERTAIN PREFERRED FORMS OF THE INVENTION

The invention is of course independent of size, but the size of the present embodiment is shown by the scale of millimeters on the page of figures.

Referring firstly to FIG. 2 there is shown an extrusion which has been made and tested successfully in aluminium. It will be seen that it is based on a substantially circular tube 10, but this could be replaced by almost any imaginable section such as square section, which would hold rigidly the seatings to be described. If strip 11 is to be held at rightangles to the axis of tube 10 and has a square end, the first part of the seating 12 is an abutment for the end face 13 of the strip. Immediately alongside abutment 12 is a second abutment 14 to take the end 15 of the strip 11. A groove 16, is provided adjacent abutment 14 partly to avoid an interference fit with the strip 11 and partly to assist in the process of extrusion. Beyond the groove 16 is a tongue having one face 17 which in use engages with face 18 of the strip 11. Face 19 of the tongue is an abutment for the base of a groove 20 cut across the strip. It is not intended that the second side 21 of groove 20 shall be an operational fit on the tongue, however, an unsightly gap between the tongue and side 21 would of course be undesirable.

Two pairs of faces then engage with each other. One pair is faces 13 and 18 of the strip and the other pair is abutment face 12 and face 17 of the extrusion. It is an improvement if one or both of these pairs are not precisely parallel but are wedged with the apex towards abutment 14 or face 15 of the strip 11 as this provides a tighter fit than would be the case with faces which are strictly parallel.

In use, a hole for a self-tapping screw S is drilled on line 27 between the two strips and a clearance hole at 23 through the wedge W of FIG. 1. When a strip 11 has been engaged in each side of the extrusion 10, the wedge W is brought between two strips 11 as shown in FIGS. 5 and 6 and this, when screw S is driven home, holds the two strips 11 very firmly in place.

For the purpose of making the joint only a strip is needed but in supporting the table of a trolley, a shelf or a table top it is convenient if the strips are in fact one flange 26 of an angle as shown for example in FIG. 6. Assuming that the ends of two angles have been cut as shown in FIGS. 3 and 4 and a number of lengths of the extrusion of FIG. 2 have been drilled at appropriate heights, a tray or a trolley or a shelf is made by hooking lengths of angle into the appropriate seatings, screwing in the wedge W and dropping in a plain top 24.

If this were the whole operation, the inner side of the legs of the trolley or shelves, would appear as is shown towards the top of FIG. 6. For aesthetic and hyienic reasons this might be undesirable and therefore a cover bead 25 can be provided. This cover bead 25 has a section such that it slides into the grooves of the extrusion of FIG. 2 and is held in place by screws, as in wedge W. The extrusions of FIG. 2 and cover bead 25 can be so arranged that the joint between them is hardly noticeable. The cover bead 25 helps in the assembly of a joint, since the extrusion 10 of FIG. 2 can be filled by bead 25 up to the level at which the joint is to be made so that the strips 11 to be assembled into the joint can more readily be lined up.

Bead 25 is not limited to the outer, curved surface illustrated. This surface may carry for example webs aligned with the strips of FIG. 3 to form the supports for walls of a cabinet.

What is claimed is:

1. A construction joint comprising:
   a continuous length of the tube, rod or other extruded or rolled section, having on its periphery two seatings, each of said seatings including a tongue and a pair of substantially perpendicular abutment faces adjacent said tongue;
   two strips, each strip having a forward edge at one end thereof, each strip including a groove; and
   a screwably connected wedge, said two seatings being adapted to hold said one end of each of said two strips at a pre-determined angle to the line of the continuous length and to hold said wedge between said two strips, such that the two strips are firmly held into the seatings, each of said abutment faces engaging with said forward edge corner of one of said strips each of said tongues interlocking with said groove in one of said strips.

2. A construction joint as claimed in claim 1 wherein the parts of the seatings not occupied by wedges may be filled by cover beads having their edges slid into and engaged in said further grooves between the abutment faces and adjacent tongue.

3. A construction joint as claimed in claim 1 wherein a further groove is provided between each pair of abutment faces and the adjacent tongue.

4. A construction joint as claimed in claim 1 wherein the two strips and two seatings are adapted to hold the two strips at right angles to each other and normal to the line of the continuous length.

5. A construction joint as claimed in claim 4 wherein each of the two strips includes a support member along its lengths.

6. A construction joint as claimed in claim 1 wherein the continuous length is an extrusion of aluminium or other extrudable metal.

7. A construction joint as claimed in claim 6 wherein the continuous length is of hollow square cross section.

8. A construction joint as claimed in claim 1 wherein the continuous length is formed from a thermoplastic resin.

* * * * *